(12) United States Patent
Sulik (10) Patent No.: US 6,984,947 B2
(45) Date of Patent: Jan. 10, 2006

(54) APPARATUS AND METHOD FOR ADJUSTING COMPONENTS OF AN OPTICAL OR MECHANICAL SYSTEM

(75) Inventor: Wolfgang Sulik, Waldsolms (DE)

(73) Assignee: Leica Microsystems Wetzlar GmbH, Wetzlar (DE)

( * ) Notice: Subject to any disclaimer, the term of this patent is extended or adjusted under 35 U.S.C. 154(b) by 367 days.

(21) Appl. No.: 10/196,556

(22) Filed: Jul. 17, 2002

(65) Prior Publication Data

US 2003/0015978 A1 Jan. 23, 2003

(30) Foreign Application Priority Data

Jul. 20, 2001 (DE) .......................................... 101 35 511

(51) Int. Cl.
*H02P 5/20* (2006.01)

(52) U.S. Cl. ...................... 318/140; 318/640; 318/602; 318/592; 318/34

(58) Field of Classification Search ................ 318/140, 318/640, 602, 592, 593, 594, 595, 596, 34; 350/530, 521
See application file for complete search history.

(56) References Cited

U.S. PATENT DOCUMENTS

| | | | | | |
|---|---|---|---|---|---|
| 4,695,137 | A | * | 9/1987 | Jorgens et al. | ............... 359/383 |
| 4,712,167 | A | * | 12/1987 | Gordin et al. | ............... 362/233 |
| 4,930,882 | A | * | 6/1990 | Koch et al. | ................. 359/392 |
| 6,328,737 | B1 | * | 12/2001 | Moorcroft et al. | ............ 606/57 |
| 6,334,462 | B1 | * | 1/2002 | Dore et al. | ............ 137/625.65 |
| 6,390,560 | B1 | * | 5/2002 | Gandhi et al. | ........... 297/463.1 |

* cited by examiner

*Primary Examiner*—Karen Masih
(74) *Attorney, Agent, or Firm*—Foley & Lardner LLP (57) ABSTRACT

An apparatus and a method for adjusting components of an optical system, the components including an adjustment device. An electric positioning motor can be engaged onto the adjustment device of the components. An electrical generator is electrically connected to the positioning motor. The generator can be manually operated using an operating element, thereby effecting an adjustment of the component.

12 Claims, 5 Drawing Sheets

** APPARATUS AND METHOD FOR ADJUSTING COMPONENTS OF AN OPTICAL OR MECHANICAL SYSTEM

CROSS REFERENCE TO RELATED APPLICATIONS

This application claims priority of the German patent application 101 35 511.4 which is incorporated by reference herein.

FIELD OF THE INVENTION

The basis of the invention is an apparatus and a method for adjusting components of an optical or mechanical system, the components comprising an adjustment device.

BACKGROUND OF THE INVENTION

In any optical system, for example a microscope or an optical measurement or inspection system, there exists a plurality of components that are adjustable or alignable in particular for the purpose of light beam guidance. Such components are optical and mechanical elements such as, for example, individual lens elements, lens groups, prisms, mirrors, optical filters, light guides, lamps, or slits, diaphragms, objective turrets, camera mounts, or microscope stages. All the components must be aligned with one another to ensure an appropriate beam path and thus also an appropriate optical performance of the optical system. An alignment of the components prior to initial operation of the optical system, which must be performed very precisely depending on the components, is therefore normally necessary. A realignment may also be necessary during operation, however, after certain operating periods.

The alignment is generally performed by manual operation directly on the components to be aligned. The components are mounted so as to be mechanically displaceable and/or rotatable with respect to their mounts. In the simplest case, longitudinal displacement or rotational movement of the components can be accomplished by sliding, using linear or curved elongated holes. For stringent requirements, correspondingly precise guide rails, rotary apparatuses, or precise ball bearings are used. Mechanical tools, which in some cases are manufactured especially for the alignment of specific subassemblies, are placed directly onto the components and the latter are adjusted in terms of their spatial position and/or rotational position.

In the case where a microscope constitutes the optical system, the alignment can be accomplished during assembly on the other hand by means of simple visual checks of the components. In most cases, however, the alignment is performed on the microscope under operating conditions. A specimen is continuously observed under the microscope by looking into the microscope's eyepiece. Or the specimen is imaged by an electronic camera mounted on the microscope, and its image is observed online on a monitor. At the same time, the relevant components are manually set with alignment tools.

The fact that access to the components is often limited, however, makes the alignment operation cumbersome and inconvenient. Alignment is especially troublesome if the individual components are located physically far away from one another, for example because it is impossible to look into the microscope tube or because the monitor must be appropriately rotated in each case so it can be observed during the alignment setting process. This procedure is also time-consuming.

Similar considerations also apply to the adjustment of components for other purposes that do not serve for alignment but rather can be used to modify parameters of the microscope during operation. Depending on the microscope mode or the requirement resulting from the observation or measurement task, the optical elements or mechanical subassemblies must be mechanically adjusted in order to be optimally arranged for the respective microscope mode. For example, the position of diaphragms, filters, or mirrors in the beam path must be modified; the offset lens system of an autofocus system must be adjusted for purposes of selecting the focal plane; or the width of slits or the orientation of the illumination system must be modified in order to achieve optimization of the microscope or the measurement or inspection system for a specific task. If these adjustments are not automated, the user must make the adjustments him- or herself directly on the subassemblies. In this case as well, the overall configuration of the microscope means that not all subassemblies are equally easily accessible, and the settings cannot always be carried out ergonomically.

In the case of larger mechanical or optical assemblages in particular, for example measurement and inspection devices for the semiconductor industry for the examination of wafers, mechanical and optical subassemblies are often located far away from one another and are difficult to reach for adjustment during operation or for alignment. Measurement and inspection devices of this kind contain not only optical subassemblies but also a plurality of purely mechanical subassemblies, such as an input station for cassettes that are loaded with wafers or masks that are to be examined, and apparatuses for removing the individual wafers or masks from the cassettes and transporting them to the microscope stage. For precise operation, the mechanical alignment of these mechanical handling systems, and also of any electronic or optoelectronics monitoring elements, must be correspondingly good. In this context, access to the components that are to be aligned or adjusted, and their operability for controlled adjustment, is particularly difficult because of the large overall configuration of the devices.

SUMMARY OF THE INVENTION

It is the object of the invention to describe an apparatus and a method for adjusting components of an optical or mechanical system with which the components can be adjusted quickly as well as easily, conveniently and controllably in terms of operation, the apparatus moreover being economical.

The object is achieved by means of an apparatus of the kind described above, by way of
 at least one electric positioning motor that is provided on the adjustment device of the components; and
 at least one electrical generator with which the positioning motor can be directly actuated.

The apparatus and the method according to the present invention make possible a remote setting or remote alignment of mechanical and optical components of an optical or mechanical system.

In a first embodiment, the electric positioning motor is joined detachably to the component that is to be adjusted. Engagement of the positioning motor onto the component can be accomplished directly by way of the drive shaft of the positioning motor. The end of the drive shaft has a specific shape, or a shaped element is mounted on the drive shaft and the matching counterelement is integrated into the component that is to be adjusted. As a result, the positioning motor can be slipped onto the component and can be detached from it, by being pulled off, after adjustment of the component. This therefore makes possible fast, simple, and easy engagement of the positioning motor onto the component and, similarly, disengagement from the component.

A linkage can of course be provided on the drive shaft of the positioning motor or on the component, so that the engagement and disengagement of the positioning motor and component are accomplished via the linkage.

The positioning motor is connected to an electrical generator by means of flexible electrical conductors. The electrical conductors are preferably to be connected in plug-in fashion to the positioning motor and/or the generator, and their length can be selected by the user. The electrical connecting conductor can of course also be permanently secured to the positioning motor and/or generator, thereby resulting in a maximum distance between positioning motor and generator. That distance, governed by the conductor length, is coordinated with the size of the optical or mechanical system so that all components that are to be adjusted can be conveniently reached.

Electrical energy is generated by the electrical generator, and the positioning motor is driven thereby. The electrical generator can be an electric motor that is operated in generator mode. A user can operate the generator using an operating element, for example a rotary knob placed onto the shaft of the generator. An appropriate linkage can optionally be interposed therebetween. Upon actuation of the rotary knob, a voltage is generated in the generator and a current can flow via the electrical conductors through the positioning motor. The positioning motor moves the component joined to it. Depending on the direction in which the generator is rotated, the positioning motor rotates forward or backward and thereby moves the component in one direction or the other. A manually executed motion at the generator is thus transferred to the remotely located component, so that the latter can be adjusted in terms of its physical position or angular position. Instead of a mechanical adjustment performed directly on the component with a tool, the component is thus adjusted or aligned by remote control, by interposition of the apparatus according to the present invention.

Since actuation of the generator by the user causes the generation of electrical energy that effects the motion of the positioning motor, adjustment of the components in the optical or mechanical system is independent of any electrical energy delivery from outside. There is thus no need for an electrical connection, power supply component, or any other power delivery by means of an electronic circuit or battery. The apparatus according to the present invention thus possesses the additional advantage that it is independent of grid power and energy.

The generator, optionally with a connected or integrated linkage, can be mounted in a movable housing serving as a control panel. Because of the flexible electrical conductors between the generator and positioning motor, the control panel can easily be taken to locations that allow convenient operation for the user. If it is necessary, for example, while adjusting a component, to look into a microscope in order to observe the optical changes resulting from the adjustment, the control panel can then be placed next to the microscope within convenient reach for operation. If the user is left-handed, he or she can place the control panel at the left side of the microscope.

If, on the other hand, the results of the adjustment of the component are to be followed on a monitor, the control panel can then be placed in the vicinity of the monitor. The user can perform an adjustment or alignment of the component while continuously observing the monitor display. Both acquired images of the specimens under the microscopes or other kinds of images reflected in, or measurement results in numerical form or as graphics, can be displayed on the monitor to permit conclusions as to a specific setting of the component.

The illumination device of the microscope, for example, can be aligned in this fashion. Since the illumination device is usually mounted on the back side of the microscope for reasons of temperature, the apparatus according to the present invention considerably simplifies the operation of aligning the illumination device. By viewing a specimen under the microscope through the microscope eyepiece or via a monitor, alignment of the illumination device can be remotely controlled and thus effected without difficulty and without any assistance by an additional person. All that is necessary is first to engage the positioning motor onto an adjustment device, provided appropriately therefor, on the illumination device, and to connect it electrically to the control panel. Alignment of the component can thus be performed in concentrated and precise fashion, and by only one person.

With the apparatus according to the present invention, all adjustable components can be operated in this fashion. The positioning motor is engaged onto the respective component, and the component is adjusted by actuation of the generator. In this context the engagement mechanisms of each component must of course be identical, so that the positioning motor can be engaged successively onto all the components.

The components contain an adjustment device with which they can be adjusted. The adjustment mechanism can take various forms depending on the precision requirement or the type of adjustment. For example, plain bearings, guide rails, or precise guides with ball bearings are used. The adjustment can be accomplished linearly in only one direction, or also in several directions. Provision can moreover be made, solely or additionally, for an angular adjustment in one or more angles. The positioning motor is either engaged separately for each of these degrees of adjustment freedom, or a corresponding switchable linkage exists on the component to switch over for all the existing degrees of freedom, so that the positioning motor needs to be engaged only once. Alternatively to this, there can also be a capability for simultaneously engaging several positioning motors for the degrees of freedom, as will be explained below in more detail.

In addition to the easier alignment capabilities, the apparatus according to the present invention and the associated method can also be used during normal utilization of the optical system for specific adjustment of a component. Specific inspection or measurement tasks can be performed better and more accurately. It is possible, for example, to adjust the illumination device of a microscope specifically in order to produce special illumination effects. An oblique illumination of a specimen (partial-pupil illumination) can be established in this fashion. Or, for very precise observations or measurements with the microscope, the illumination can be refined and optimized depending on the microscope mode (e.g. bright-field or dark-field illumination) by way of a respectively modified setting of the illumination device.

For these purposes of adjusting components for various types of examinations, it may be expedient, instead of the variant of the generator in which its location can be varied, to install it in stationary fashion into an already existing housing, for example into the microscope housing or the housing of another existing operating element. This is a second variant embodiment of the subject matter of the invention, in which the positioning motor with the component that is to be adjusted can of course also be permanently built in. The component can thus be realigned at any time, or can be set differently for specific variant examinations, with no need for actions to engage the positioning motor.

With this variant of the subject matter of the invention, all the components to be modified or aligned can of course each be equipped with a positioning motor and connected permanently to a generator. In this case the components are each always independently modifiable. An additional apparatus for covering or locking the generator operating elements prevents any inadvertent actuation of the generators, and implements a fixed component setting. An electrical switch to interrupt the circuit between the generators and positioning motors can also serve that purpose.

In a further embodiment, several components are controlled and adjusted with the corresponding positioning motors but with only one generator. This requires a switchover apparatus that connects the generator to the respective positioning motor and the associated component. In the simplest case, the switchover apparatus can comprise several individual electrical switches. It is also possible to use a multi-pole switch with which the electrical connection between the generator and the positioning motor to be selected can be created, so that the user needs only two operating elements—the multi-pole switch and the generator—in order to adjust several components.

In special cases, the generator can even be connected simultaneously to two or more positioning motors, so that the positioning motors move simultaneously. This makes possible motions of the components diagonally in space. Simultaneous adjustment in several axes is moreover advantageous for specific adjustment devices (e.g. three-point adjusters), as set forth more exhaustively in the description of the Figures.

The switchover apparatus can be utilized both on the variant of the apparatus according to the present invention that is integrated into the optical or mechanical system, and on the movable-location variant. In the case of the movable-location variant, the switchover apparatus is integrated into the control panel together with the generator, and the positioning motors can be engaged individually onto the associated components. If several components are arranged physically close to one another, it is then advantageous to mount the positioning motors on a baseplate and thus to engage all the positioning motors onto the associated components simultaneously, in only one engagement operation. This can be done in simple and time-saving fashion, and does not result in confusion among associated positioning motors and components, assuming they are not provided from the outset with differently coded engagement elements.

This kind of arrangement of several positioning motors on one baseplate can be used, for example, for the illumination device already cited above. Within the illumination device, several components can be aligned or adjusted independently of one another. These components are the light-emitting means (halogen lamp, discharge lamp, laser, etc.), condenser, rear reflector, and optionally several diaphragms. Provision can be made for each of these components to be adjustable in various spatial directions and/or spatial angles. The positioning motors are arranged on the baseplate accordingly, and as a result can be engaged onto the illumination device with only one manual action.

With regard to the connection possibilities between the generators and positioning motors, one positioning motor can also be connected to two or more generators. Especially when longer displacement travels are involved, the one generator can provide a coarse adjustment and another generator can provide fine adjustment of the component. A generator can of course also be equipped for this purpose with a switchable linkage in order to be able to perform adjustments at different levels of fineness.

Further advantages of the invention that may be mentioned are not only great robustness and resistance to failure, but also very fast, simple, and direct operability. In contrast to components controlled electronically and by way of software, no electronics or software are required. There is no need to open a plurality of software menus in order to find and set the correct parameter.

The simplicity and economy and above all the very varied utilization capabilities of the invention are expressed in the fact that there is no need for a motor controller with a voltage supply, control loop, and amplifier with output stage. The components can be adjusted even in the event of a power failure or when a power supply is not present. This can be relevant for safety equipment. For example, safety valves that are intended to close in response to specific events can still be remotely controlled. Valves for compressed air and vacuum, or hydraulic valves, can also still be operated in the event of a power failure. The apparatus according to the present invention can also be used to define setpoints for control valves. The examples presented are, of course, not exhaustive.

BRIEF DESCRIPTION OF THE DRAWINGS

The invention will be explained in more detail below with reference to the exemplary embodiments depicted in the drawings. In the drawings, schematically in each case.

DETAILED DESCRIPTION OF THE INVENTION

Figure 1:
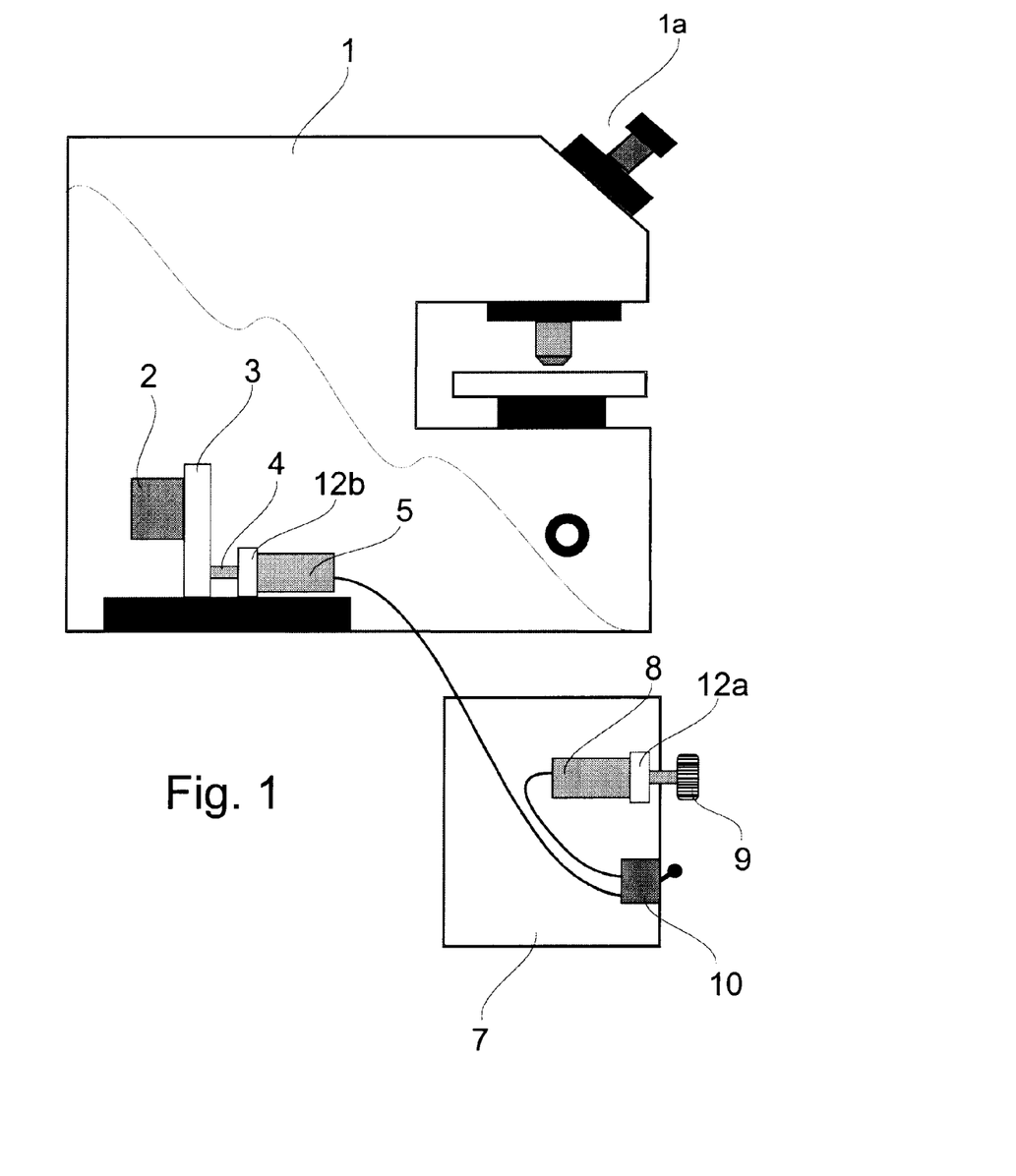
FIG. 1 shows an apparatus according to the present invention having a generator and a positioning motor, for adjusting a component in a microscope.

FIG. 1 schematically shows, as a first example of an application according to the present invention, a microscope 1 having in it a component 2 that is to be adjusted. For the adjustment of component 2, the latter comprises an adjustment device 3 onto which a positioning motor 5 can be mounted. In a first variant, positioning motor 5 is engageable onto adjustment device 3, i.e. it can also be detached again from adjustment device 3, and following the adjustment of component 2 is available for the adjustment of a further component 2. The engagement can be accomplished via a coupling 4.

Positioning motor 5 is electrically connected to an electrical generator 8 via an electrical conductor 6. Electrical conductor 6 can be a separate conductor with plug connectors, positioning motor 5 and generator 8 having corresponding electrical couplings for the connection of conductor 6. If generator 8 is mounted in a control panel 7, as shown by the exemplary embodiment in FIG. 1, the plug connection is then preferably provided on the housing of control panel 7. Instead of a plug connection, electrical conductor 6 can of course also be permanently wired to positioning motor 5 and/or to generator 8, and can a priori constitute a corresponding electrical unit.

Attached to generator 8 is an operating element 9 with which generator 8 can be operated. Operating element 9 can be configured as a rotary knob, and is joined to the shaft of generator 8. A direct-current motor is preferably used as generator 8. Rotation of operating element 9 causes a rotary motion to be imparted to the rotor of the direct-current motor, thereby producing a voltage (generator principle), so that a current can flow through conductor 6 and through positioning motor 5 and can drive positioning motor 5.

A plurality of commercially procurable electric motor types can be used for positioning motor 5 and also for generator 8. A permanent-magnet-excited direct-current motor with brush commutation, for example a coreless bell armature motor, can be used in particular as generator 8. In order to simplify the construction of the apparatus according to the present invention, motors of identical design can be used for generator 8 and for positioning motor 5.

In addition, as an advantageous embodiment of the subject matter of the invention, a linkage 12a, 12b can be provided both for generator 8 and for positioning motor 5. This allows good adaptation to be achieved between the rotation of operating element 9, the requisite electrical energy production in generator 8, the rotation of positioning motor 5, and the motion of component 2. Appropriate coordination of these elements with one another allows component 2 to be sensitively adjusted.

Linkage 12a, b determines not only the strength of positioning motor 5 but also the force that acts on adjustment device 3, and can correspondingly also be designed with that consideration in mind. In order to protect adjustment device 3 at its displacement travel limits, mechanical stops or limit switches can be provided, optionally also a slip clutch for torque limitation. In the case of a limit switch, a diode connected in parallel therewith is advantageous so that at the displacement travel limit when the limit switch is open, the current through connecting conductor 6 can flow through positioning motor 5 in only one direction, so that adjustment device 3 is moved away from the limit again.

A coreless bell armature motor with attached reduction linkage has proven successful as the drive system for the apparatus and utilization according to the present invention, in which context the linkage acts as a step-up transmission when the motor is driven manually (generator mode). The coreless bell armature motor has a low startup voltage and a highly linear voltage/rotation speed characteristic curve. It also achieves high efficiency because there are no energy losses in the core, since, in contrast to other types of motor, no core is present.

With a drive system of this kind, component 2 is adjusted by means of adjustment device 3. Depending on the configuration of adjustment device 3, component 2 can be adjusted linearly in one direction or in two or all three spatial directions X, Y, Z of a rectangular coordinate system. Adjustment device 3 can also be provided for a tilt of component 2, optionally even for all three solid angles. With a corresponding design of adjustment device 3, linear and angular adjustments can of course also be combined.

As an example of the adjustment of a component 2, mention will be made of an optical condenser, which is generally constructed from several lens elements and serves to illuminate a specimen under microscope 1. A macroscope, with which the surface of large objects can be observed under magnification, can also be present instead of microscope 1. The subject matter of the invention is, of course, also usable when a macroscope is the optical system. For optimum illumination, good centering of the condenser in the illumination beam path is necessary. Illumination of the specimen is optimized by adjusting the condenser in particular in the horizontal (X, Y) plane. The adjustment can be performed separately for each direction using only one positioning motor 5. Advantageously, however, two positioning motors 5 are installed on a mounting plate 11 (FIG. 2) and are engaged with one manual action onto adjustment unit 3 of the condenser, thus making possible alignment or adjustment of the condenser in the X-Y plane without interruption.

Figure 2:
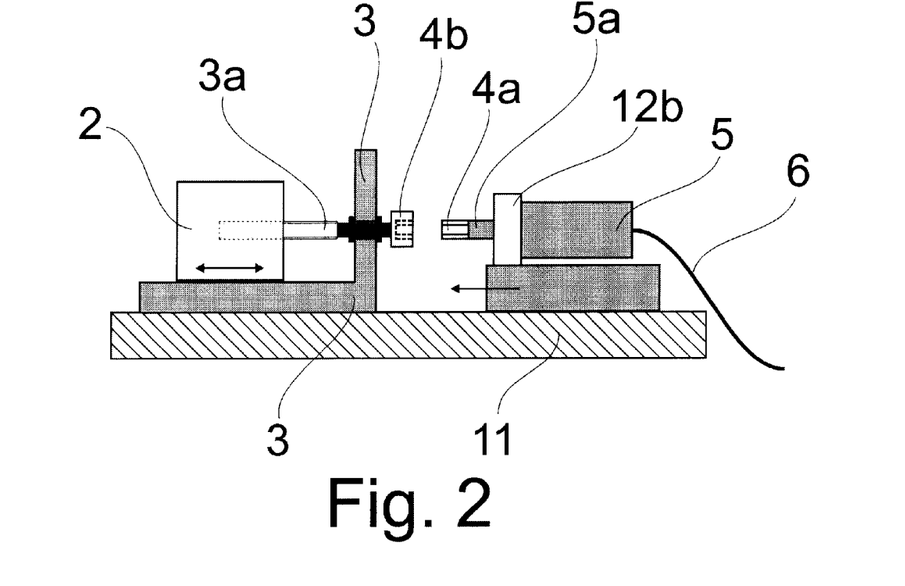
FIG. 2 is a detail view of one possible embodiment for engagement of the positioning motor onto the component.

FIG. 2 depicts in detail, by way of example, a simple embodiment of a coupling 4. It comprises a hexagonal coupling element 4a (entraining element) sitting on shaft 5a of positioning motor 5, and an internally hexagonal coupling element 4b matching it. Hexagonal coupling element 4a is inserted nonpositively into internally hexagonal coupling element 4b so that when positioning motor 5 is rotating, an adjustment screw 3a is rotated and component 2, i.e. the condenser, is thus moved linearly in a direction X. The condenser is also moved analogously in the other coordinate direction Y; it is possible to use a configuration with a pivot lever in order to be independent of the motion in the X direction. It is self-evident that depending on the requirement and the intended purpose, adjustment device 3 can be configured in many different ways familiar to one skilled in the art.

Actuation of generator 8 via operating element 9 thus causes a remotely controlled adjustment of the condenser in the two directions X and Y. The adjustment in the X and Y directions can be accomplished simultaneously if each positioning motor 5 is connected to a separate generator 8. Synchronous operation with only one generator 8 is also possible, diagonal motions being possible by way of homopolar or heteropolar connection of the two positioning motors 5.

If the application does not require synchronous operation, however, the condenser can also be driven in the two directions X, Y with only one generator 8, by switching over in alternating fashion. The switchover can be accomplished using an electrical changeover switch 10. Depending on the setting of changeover switch 10, actuation of generator 8 drives the corresponding positioning motor 5 and displaces the condenser in the corresponding direction. As FIG. 1 shows, changeover switch 10 and generator 8 are arranged together in control panel 7.

The effects of the change in the position of the condenser on the illumination beam path can be observed online. For that purpose, a specimen is observed under microscope 1, directly via a microscope viewing port 1a of microscope 1 or, if a camera is connected, on a screen, or also with the aid of a measurement instrument present in a portion of the microscope beam path, and its illumination is watched during the change in the condenser's position. The condenser can thus be aligned quickly, conveniently, and accurately upon initial operation of microscope 1 or whenever necessary. Alignment accuracies of 1 $\mu$m or better can be achieved with no particular effort.

If, instead of a normal alignment, an adjustment of the condenser for special illumination purposes (e.g. for oblique illumination) is to be performed, the apparatus according to the present invention can be used for that purpose as well.

After alignment or adjustment of the condenser, positioning motor 5 is removed, e.g. by simply pulling positioning motor 5 off the condenser so that coupling elements 4a, 4b are once again separated (FIG. 2). The apparatus according to the present invention can then be used for adjustment of another component 2. For example, the entire illumination device of microscope 1, its individual parts or diaphragms, slits, or any other adjustable mechanical and optical elements of microscope 1, can be adjusted using the subject matter of the invention.

Figure 3:
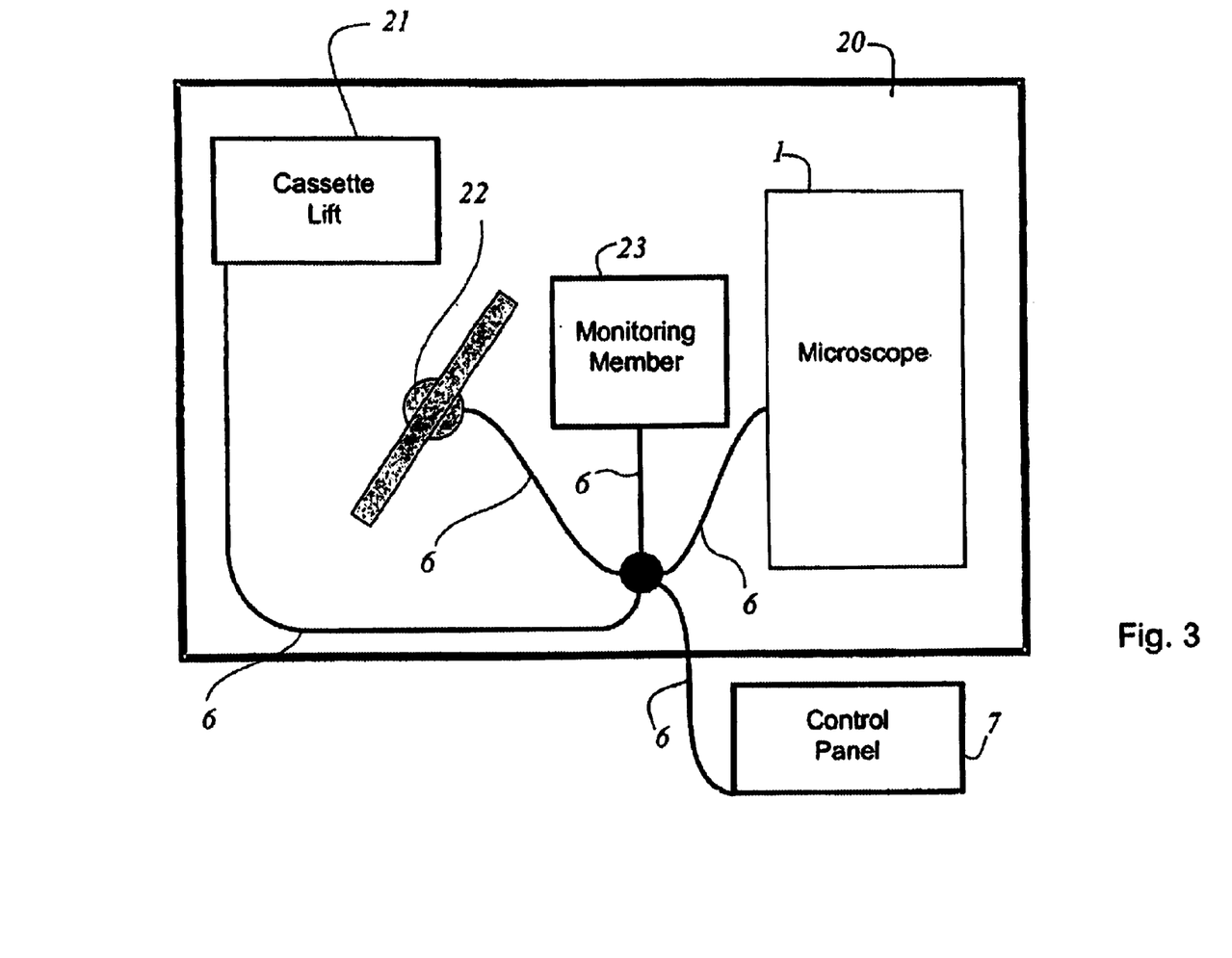
FIG. 3 shows an exemplary embodiment with an optical measurement and inspection device.

The apparatus according to the present invention can be used for any mechanical and optical assemblage. As a further exemplary embodiment, FIG. 3 shows an inspection and measurement system 20 with which wafers or masks for the semiconductor industry can be inspected and measured. The wafers are introduced into inspection system 20 in cassettes. A cassette lift 21 displaces the cassettes for removal of the wafers, in which context it must maintain precise displacement distances. A corresponding alignment of cassette lift 21, as an example of a mechanical system, can advantageously be performed with the subject matter of the invention. Cassette lift 21 can be aligned in terms of both its displacement direction and its inclination. Similarly, a mechanical wafer exchanger 22 or optoelectronic monitoring members 23 for the wafer movements within inspection system 20 can be aligned or can be adjusted for different wafer sizes. One or more positioning motors 5 are engaged respectively onto cassette lift 21, wafer exchanger 22, or monitoring members 23 for alignment purposes, and are electrically connected via conductors 6 to control panel 7 and to one or more generators 8 and optionally changeover switches 10. It is thus possible, by way of control panel 7, to remotely operate a plurality of axes and to adjust the associated components.

If applicable, positioning motors 5 and generators 8 can also be integrated and permanently installed in the optical and mechanical systems.

Because of the plurality of available motor/linkage combinations, the remote alignment or remote adjustment of components 2 can easily be adapted to a variety of other adjustment and alignment applications. Since the apparatus according to the present invention for remote control of components 2 requires neither electronics nor a power supply, it is economical and its reliability is very high.

A further application of the invention consists in the easy decorrelation of alignment axes A, B, C (three-point mount) and nonconforming spatial axes X, Y, Z of a rectangular coordinate system.

Figure 4A:
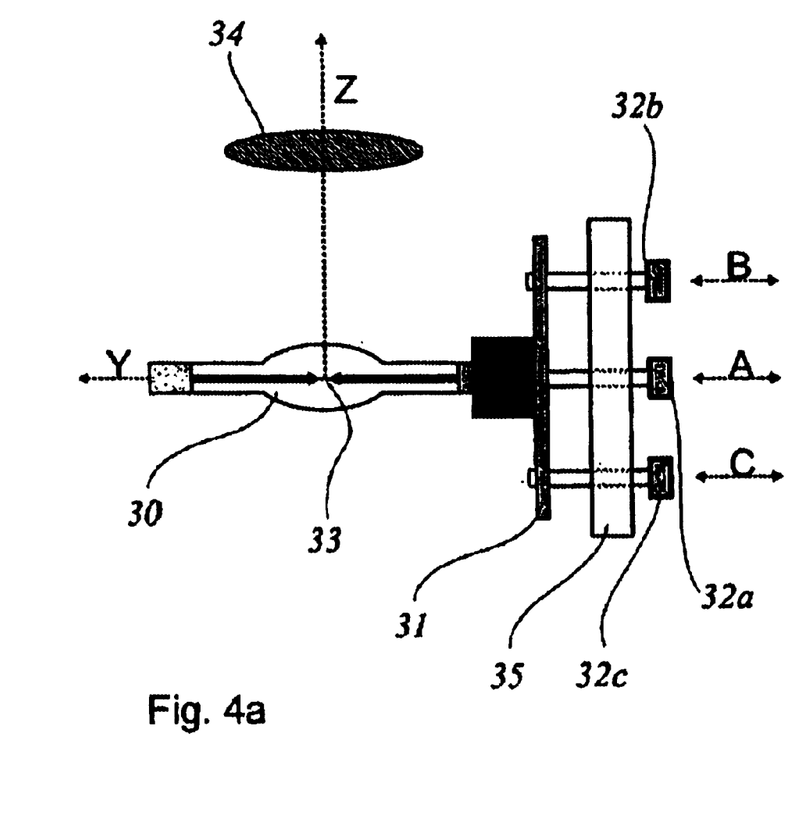
FIGS. 4a and 4b show a three-point bearing with a transformation into right-angle spatial axes for the decorrelation of alignment axes.
Figure 4B:
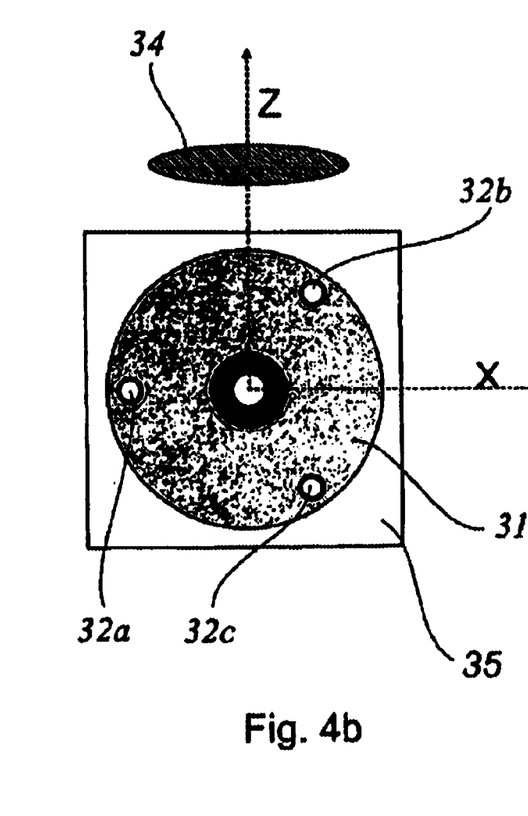

Alignment axes A, B, C are defined by the mechanical embodiment of the adjustment elements and their mounting on components 2 that are to be aligned. In FIGS. 4a and 4b, alignment axes A, B, C are configured parallel to one another. Spatial axes X, Y, Z, on the other hand, are perpendicular to one another and are oriented, for example, on the optical axis Z of an optical system (not depicted here).

FIGS. 4a and b show, as an example, the alignment of an arc lamp 30. FIG. 4a shows a section in the X-Z plane of the coordinate system, and FIG. 4b shows a section in the Y-Z plane. A lamp base 31 is adjustable by means of three alignment screws 32a, b, c that are offset 120 degrees from each other. Alignment screws 32a, b, c are adjusted in the direction of the parallel alignment axes A, B, C associated with them. An adjustment of each alignment screw 32a, b, c means a tilting of lamp base 31 and thus a correspondingly modified position of arc 33 of arc lamp 30. Arc 33 is located a certain distance above lamp base 31. The light emitted by the arc lamp is collected by a collector lens 34 that is located on the optical axis Z.

This type of mount is economical and offers good reproducibility and stability in terms of lamp position during use. One disadvantage of this mechanical configuration, however, is the fact that the parallel alignment axes A, B, C do not conform to the rectangular spatial axes X, Y, Z, and thus are also not coupled to the optical axis Z. Upon manual alignment with one of alignment screws 32a, b, c, at least two of the spatial axes X, Y, Z are therefore affected. Spatial axes X, Y, Z cannot be adjusted in isolation, and it is difficult for the user to observe the spatial changes in arc 33 in the image field of a microscope 1 during alignment of arc lamp 30.

In such a case, each of the three alignment axes A, B, C, is equipped with a separate positioning motor 5. A generator 8 and a changeover switch 10, having at least three switch positions for implementing three different electrical connections of positioning motors 5, are provided. As a result of the corresponding electrical connections of positioning motors 5 to generator 8, the three alignment axes A, B, C can now be transformed in terms of the position of arc 33 of arc lamp 30, with almost no feedback, onto the spatial axes X, Y, Z, as follows:

1. A parallel connection of all three positioning motors 5 with the same rotation direction results in a motion of arc 33 of arc lamp 30 (and also base plate 31) in the direction of the Y axis.
2. If positioning motor 5 of alignment axis A is activated in such a way that it rotates in the opposite direction from positioning motors 5 of alignment axes B and C (positioning motors 5 of alignment axes B and C being connected, in order to reduce the speed, not in parallel but in the same direction in series), this wiring of positioning motors 5 then results in a motion of arc 33 approximately in the direction of the X spatial axis.
3. If positioning motors 5 of alignment axes B and C are wired oppositely, and if positioning motor 5 of alignment axis A is not driven, arc 33 then moves approximately in the direction of the Z spatial axis.

With these various ways in which the connections of positioning motors 5 can be configured, an appropriate setting of changeover switch 10 and an actuation of generator 8 results in an adjustment of arc 33 of arc lamp 30 in the respective spatial axis X, Y, Z. The adjustment in the Y spatial axis occurs precisely, while the X and Z adjustments are performed correspondingly approximately, depending on the adjustment travel and the distance between arc 33 and base plate 31.

Figure 5:
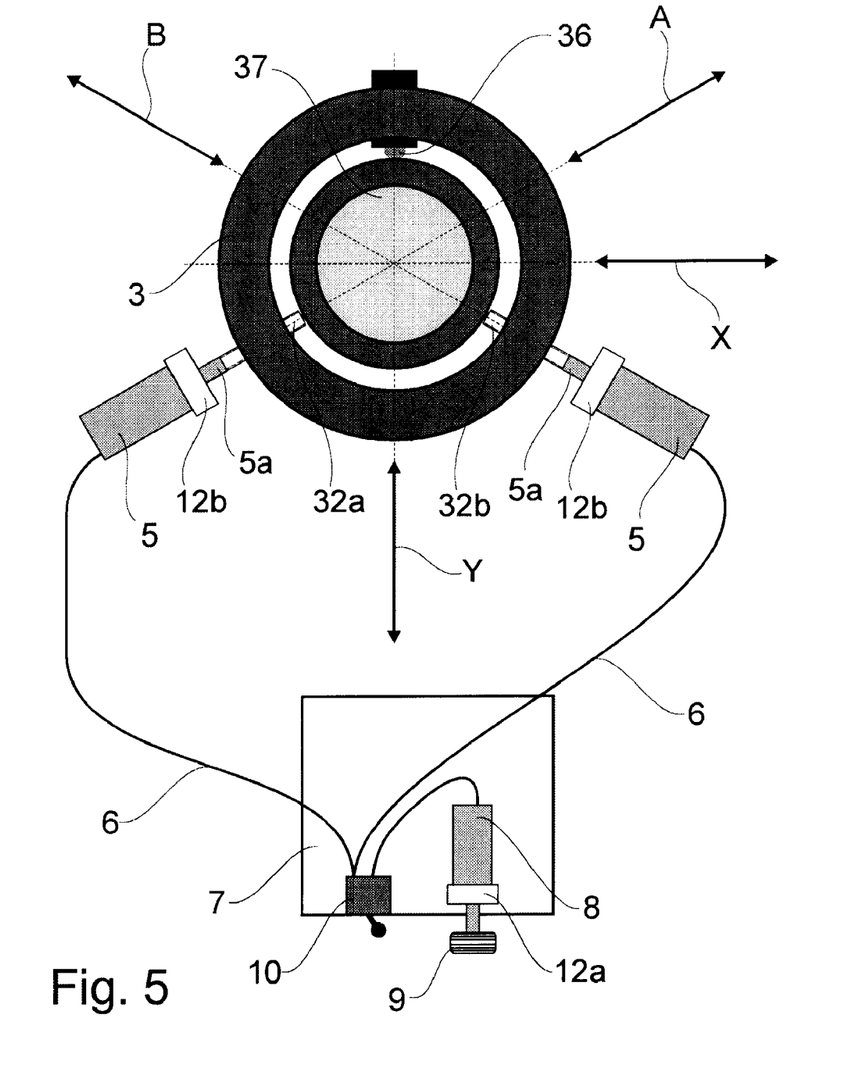
FIG. 5 shows an arrangement for the decorrelation of two alignment axes.

FIG. 5 shows a further example of the decorrelation of alignment axes A, B and nonconforming spatial axes X, Y of a two-dimensional rectangular coordinate system, using the example of a centering unit for an optical lens system.

Alignment axes A, B are defined by the mechanical configuration of adjustment device 3. In FIG. 5, alignment axes A, B are embodied with a 120-degree offset with respect to a resiliently mounted pressure pin 36. Spatial axes X, Y, on the other hand, are perpendicular to one another and are, for example, aligned on the optical axis Z of optical lens system 37 mounted at the center.

In this instance, each of the two alignment axes A, B is equipped with a separate positioning motor 5. A generator 8 and a changeover switch 10, having at least two switch positions for implementing two different electrical connections of positioning motors 5, are provided. As a result of the corresponding electrical connections of positioning motors 5 to generator 8, the two alignment axes A, B can now be transformed in terms of the position of optical lens system 37, with almost no feedback, onto the spatial axes X, Y, as follows:

1. A parallel connection of the two positioning motors 5 with the same rotation direction results in a motion of optical lens system 37 in the direction of the Y spatial axis.
2. A parallel connection of the two positioning motors 5 with opposite rotation directions results in a motion of optical lens system 37 in the direction of the X spatial axis.

The linearity errors occurring as a result of motor tolerances and geometric deviations can be ignored in the context of the application described.

All the embodiments hitherto cited can be used as such and in modified forms for any adjustable mechanical and optical component 2. One representative of many applications that may be cited is the setting of aperture and field diaphragms during operation of any optical system. Instead of complex mechanical designs with control cables and knurled wheels, the use of the apparatus according to the present invention means greater freedom for the designer and less production complexity at decreased cost. It is no longer necessary to ensure precise positioning of the knurled wheels. The apparatus according to the present invention can also be used to pivot or shift graduated-density filters into poorly accessible optical beam paths in order to attenuate the light intensity of, for example, UV light. Camera adjustments (zoom, autofocus, axial position) can also be performed with it.

The apparatus according to the present invention is also advantageous to use because of its low cost, since expensive electronic microprocessor control systems are not necessary. This becomes especially noticeable in the context of non-automatic, lower-cost mechanical and optical systems.

What is claimed is:

1. An apparatus for adjusting components of an optical system, the components comprising an adjustment device, the apparatus comprising:
   at least one electrical position motor that is provided on the adjustment device of the components; and
   at least one electrical generator with which the at least one electrical positioning motor can be directly actuated,
   wherein the at least one electrical positioning motor operates independent of any electrical energy delivery from outside other than from the at least one electrical generator.

2. The apparatus as defined in claim 1, wherein the positioning motor can be engaged onto the adjustment device of the components.

3. The apparatus as defined in claim 1, wherein the positioning motor is permanently joined to the adjustment device of the component.

4. The apparatus as defined in claim 1, wherein the generator is permanently electrically connected to the positioning motor.

5. The apparatus as defined in claim 1, wherein a linkage is provided for the positioning motor and/or for the generator.

6. The apparatus as defined in claim 1, wherein an operating element for manual operation of the generator is provided.

7. The apparatus as defined in claim 1, wherein several positioning motors are electrically connected to one generator, with interposition of at least one electrical changeover switch.

8. The apparatus as defined in claim 1, wherein one or more positioning motors are provided for adjustment of the component in three spatial directions X, Y, Z and/or in three solid angles.

9. The apparatus as defined in claim 1, wherein the optical system is a microscope or a measurement or inspection system related thereof.

10. The apparatus as defined in claim 1, wherein the at least one electrical generator and the at least one electrical positioning motor are directly connected only through an electric conductor.

11. A method for adjusting components of an optical system, the components comprising an adjustment device, the method comprising the steps of:
    engaging at least one electrical positioning motor onto the adjustment device of the component;
    connecting electrically the at least one electrical positioning motor to at least one electrical generator;
    operating the at least one electrical generator by a user by means of at least one operating element, thereby effecting the adjustment of the component,
    wherein the at least one electrical positioning motor operates independent of any electrical energy delivery from outside other than from the at least one electrical generator.

12. The method as defined in claim 11, wherein the at least one electrical generator and the at least one electrical positioning motor are directly connected only through an electric conductor.

* * * * *